United States Patent [19]
Hart

[11] Patent Number: 5,975,336
[45] Date of Patent: Nov. 2, 1999

[54] CONTAINING DEVICE WITH REMOVABLE THERMAL INSULATING LAYER

[76] Inventor: David Alan Hart, P.O. Box 11009, Fort Worth, Tex. 76110

[21] Appl. No.: 09/023,034

[22] Filed: Feb. 13, 1998

[51] Int. Cl.[6] ........................................................ B65D 5/56
[52] U.S. Cl. .............................. 220/592.17; 220/592.16; 220/592.2; 220/592.28; 220/739; 62/259.3; 62/457.4
[58] Field of Search .......................... 220/592.16, 592.17, 220/592.2, 592.28, 62.12, 739; 62/259.3, 457.4

[56] References Cited

U.S. PATENT DOCUMENTS

| | | | |
|---|---|---|---|
| 4,261,501 | 4/1981 | Watkins et al. | 220/592.17 |
| 4,986,089 | 1/1991 | Raab | 62/457.4 |
| 4,993,580 | 2/1991 | Smith | 220/592.16 |
| 5,005,374 | 4/1991 | Spitler | 62/259.3 |
| 5,147,067 | 9/1992 | Effertz | 220/739 |
| 5,188,877 | 2/1993 | Magaro | 428/80 |
| 5,314,086 | 5/1994 | Short | 220/592.16 |
| 5,325,991 | 7/1994 | Williams | 220/739 |
| 5,595,069 | 1/1997 | Gies | 62/457.1 |
| 5,769,311 | 6/1998 | Morita et al. | 220/592.17 |

*Primary Examiner*—Joseph M. Moy
*Attorney, Agent, or Firm*—J. Kevin Gray, Esq.

[57] ABSTRACT

A containing device capable of receiving beverage containers of a variety of sizes and shapes and further providing and maintaining for an extended period of time a temperature substantially above or below ambient temperature to said beverage container is disclosed. The containing device of the present invention comprises a main body portion constructed of materials having thermal insulating properties and at least one removable sleeve. The removable sleeve is comprised of a series of alternating tubes and pockets, the tubes containing either a reusable refrigerant or a substance capable of providing thermal energy, and the pockets containing a substance which remains flexible over a wide range of temperatures. The alternating placement of the tubes and pockets within the removable sleeve allows the substance in the tubes to be rigid and yet still allow the main body portion to receive beverage containers of a variety of sizes and shapes.

20 Claims, 3 Drawing Sheets

CONTAINING DEVICE WITH REMOVABLE THERMAL INSULATING LAYER

TECHNICAL FIELD

The present invention relates to containers, and, more specifically, to a thermally-insulating container especially adapted for use with beverage and liquid containers.

BACKGROUND OF THE INVENTION

Beverages and other liquids intended for human consumption are routinely purchased and/or consumed at temperatures substantially above or, more often, below room or ambient temperature. This results in part from the fact that humans desire consumption of beverages at a temperature opposite that of their current environment. Accordingly, chilled beverages (e.g., soft drinks and beer) are more often consumed in warmer environments (e.g., summer months) and warmed beverages (e.g., hot chocolate and soups) are more often consumed in colder environments (e.g., winter months). Health concerns, such as spoilage from microbiological contamination, also contribute to efforts to manufacture, store and dispense beverages and consumable liquids at temperatures above or below room temperature.

While such beverages and liquids can simply be chilled in a refrigerator or heated in a microwave oven to obtain a desired temperature for consumption, humans typically desire to consume such beverages over an extended period of time and in a manner which allows them to take part in activities remote from such modern heating and cooling devices. For example, while soft drinks, water, beer and the like can be chilled prior to consumption in a cooler containing ice during outdoor activities (e.g., outdoor sports events), once the beverage is removed from the cooler, the heat from the surrounding environment will fairly quickly raise the temperature of the beverage to a point where it is no longer desirable. This scenario also requires frequent replenishment of the ice in the cooler. Likewise, the removal of a portion of a heated beverage (e.g., removing a cup of hot chocolate from a thermal insulating container, such as a Thermos®) at a outside winter sporting event will result in a fairly rapid decrease in the temperature of the beverage, quickly reducing its desirability.

The addition of ice directly to a beverage is likewise of limited utility since the ice melts and dilutes the beverage, altering its taste and desirability. The inevitable dilution and altering of taste caused by the melting ice is particularly undesirable with chilled beverages such as teas (especially sweetened and/or flavored tea) and alcoholic beverages, such as beer.

The foregoing has provided the impetus for the development of a number of modern devices designed to store and/or dispense beverages and other liquids at temperatures above or below ambient temperature. Many of these devices are containers or holders which include insulating qualities in an effort to extend the time a beverage remains cold or hot. Most are constructed of a foam material which is designed to inhibit the transfer of heat through it. By encasing the beverage container in this material, the inevitable exchange of heat between the beverage and the surrounding environment is slowed. Others prior art devices are designed to encase the beverage container and provide a layer of dead air surrounding the container such that heat exchange is retarded. While certain of these devices have achieved a modicum of success, they all suffer to some extent from common disadvantages. For example, each of the above-identified devices require the beverage or liquid container be chilled or heated prior to use of the device. In other words, these devices merely attempt to maintain a desired temperature reached via some other device (e.g., refrigerator or oven).

Accordingly, there has been developed containers which can be heated or chilled directly before receiving a beverage container. While these designs offer certain advantages over the prior art devices discussed above, they still suffer from size, expense and limited-purpose disadvantages. For example, many of the prior art containers which can be chilled are bulky and cumbersome to handle. Additionally, since the entire containing device is chilled, exterior surfaces (e.g., handles, outer surfaces) contacted by humans are chilled as well, making the handling and consumption of the chilled beverage within them difficult and/or uncomfortable. Finally, most such prior art devices are incapable of receiving beverage or liquid containers of various sizes, severely limiting their utility.

In view of the above, it is clear that there remains a need for an inexpensive, adjustable and relatively simple device capable of containing a beverage or consumable liquid and producing, as well as maintaining for extended periods of time, a desired temperature for such beverage or liquid. Such an ideal container preferably would be constructed such that it is capable of receiving beverage or liquid containers of a variety of sizes and shapes and would also be reusable. It would thus be a marked advance over the prior art to provide such a container which does not exhibit the use, complexity and expense concerns associated with the prior art.

SUMMARY OF THE INVENTION

The present invention provides an inexpensive, convenient and relatively simple containing device capable of receiving beverage or liquid containers of a variety of sizes and shapes, capable of producing and maintaining for an extended period of time a desired temperature above or below ambient temperature of such beverage or liquid, and is reusable. For purposes of this application, the term "beverage" is used to refer to consumable substances of all types and phases, including by way of illustration only and not limitation, soft drinks, alcoholic beverages, soups, teas, coffees, water and the liked. It is also understood that, for purposes of this application, the term "beverage container" shall be used to refer to containers and receptacles of all types, materials and design constructions, including by way of illustration only and not limitation, drinking cups, glasses, cans, bottles, boxes, mugs and the like.

The containing device of the present invention is comprised of a generally cylindrically-shaped main body portion and a generally rectangular, removable sleeve. The removable sleeve is flexible and fits within the main body portion of the containing device to provide means by which to produce and maintain for an extended period of time a temperature above or below ambient temperature.

In one embodiment, the containing device of the present invention includes two removable sleeves, each comprised of a plurality of tubes interspaced with a plurality of pockets, said tubes alternating with, and flexibly linked to, said plurality of pockets. The tubes of the first sleeve contain a substance capable of being refrigerated and retaining for an extended period of time a temperature substantially lower than ambient or room temperature. The tubes of the second sleeve contain a substance capable of being heated and retaining a temperature substantially above room or ambient temperature for an extended period of time.

The pockets of the first and the second sleeves are identical and contain a gelatinous substance which remains flexible regardless of temperature. Upon refrigeration, the tubes of the first sleeve became hard as the substance within them freezes. The substance capable of being heated used in the second sleeve is substantially rigid over a wide range of temperatures. However, the pockets of each sleeve remain flexible regardless of temperature so that the overall removable sleeves are flexible and can be formed into a cylindrical shape, secured and placed within the main body portion. The flexibility provided by the alternating pockets of gelatinous substance not only allows the rigid tubes to be formed into a cylindrical shape for use within the main body potion, but also allows the main body portion to expand or contract as needed to receive a variety of sizes and shapes of beverage or liquid containers. The alternating tubes and pockets of this embodiment are linked together and are removed from the main body portion, refrigerated or heated, and placed within the main body portion as a single unit. Since this unit is flexible in nature, it can be folded upon itself, rolled up or otherwise manipulated in shape to accommodate a variety of refrigerating/heating techniques.

In use, depending upon whether a cold or hot beverage is desired, the first or second sleeve is cooled or heated, respectively, for use with the main body portion. The first sleeve can be stored in a refrigerator or freezer to facilitate quick use of the containing device, if desired. For simplicity of description, the remaining description of use of this embodiment of the containing device of the present invention will discuss only the first sleeve.

Once a cooled beverage is desired, the first sleeve is wrapped into a generally cylindrical shape, and optionally secured to itself, before it is placed within the main body portion. Once in the main body portion, the sleeve can be further secured into place and hidden from view via a zipper, hook and loop-type fastener (e.g., Velcro®) or other suitable closure device associated with the main body portion. In place, the pockets of flexible substance allow the flexible inner wall of the main body portion to receive a variety of sized and shaped beverage containers.

Importantly, since the tubes of the first sleeve contain frozen or substantially frozen material, the beverage to be consumed need not be chilled prior to placement in the containing device of the present invention. Once the beverage to be consumed is in place within the main body portion, the frozen tubes will lower or maintain (if already chilled) the temperature of the beverage for an extended period of time. The gelatinous substance of the alternating pockets serve yet another function by insulating the beverage container within the main body portion, effectively extending the extended period of time the beverage will be maintained at a lowered temperature.

In a another embodiment, the tubes of the at least one removable sleeve are individually separable from the sleeve so that such tubes can be chilled or heated, as the case may be, without the need to cool/heat the entire sleeve. This embodiment of the containing device of the present invention facilitates use of the containing device even where space within a refrigerator/heating device is limited. Once brought to a desired temperature, the tubes are simply slipped back into, and optionally secured within, the sleeve of alternating pockets before the removable sleeve is placed into the main body portion as used as outlined above.

While one embodiment discussed above includes a sleeve including tubes containing a refrigerant and a separate sleeve including tubes containing a substance capable of providing thermal energy, it is noted that the containing device of the present invention could include a single sleeve which, depending upon whether refrigerant tubes or heating substance tubes were installed, could serve to cool or warm a beverage container.

BRIEF DESCRIPTION OF THE DRAWING

For a more complete understanding of the present invention and the advantages thereof, reference is now made to the following description taken in conjunction with the accompanying drawing in which.

DETAILED DESCRIPTION OF THE DRAWINGS

Figure 1:
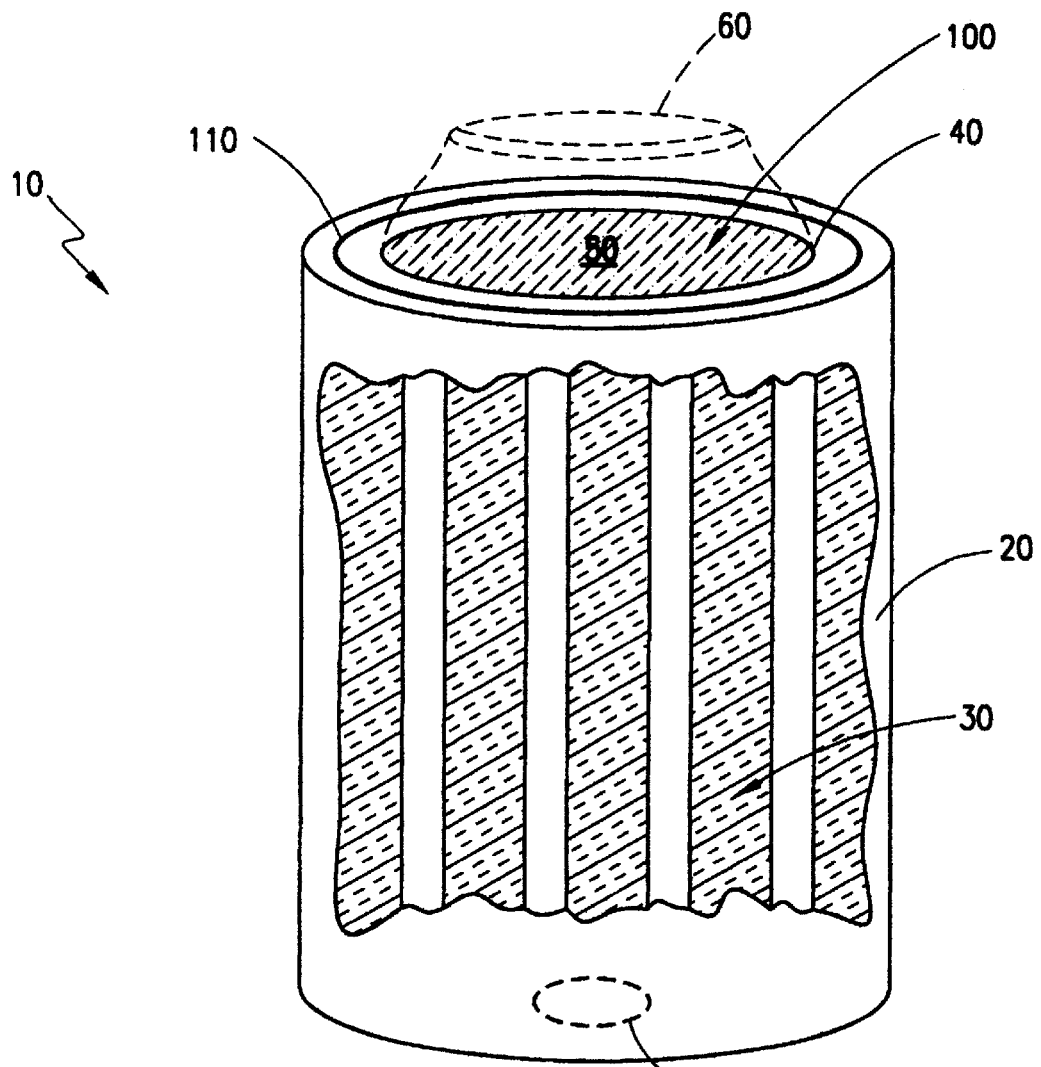
FIG. 1 is a front view of a first embodiment of the containing device of the present invention, including a partial cutaway view illustrating the removable sleeve thereof.

Referring to FIG. 1, there is shown an embodiment of the containing device of the present invention. In a preferred embodiment, the containing device 10 comprises a main body portion 20, a removable sleeve 30, a closeable slot 40 and an area 50 for receiving and holding a beverage container 60. The removable sleeve 30 is removable from the main body portion 20 through closeable slot 40.

The main body portion 20 is preferably constructed of a flexible, insulating material such as neoprene. The main body portion 20 is generally cylindrical in shape and defines the area 50 for receiving and holding the beverage container 60. The main body portion 20 includes an interior insulating layer (not shown) to prevent the exchange of thermal energy between the beverage container 60 and the surrounding environment. While neoprene is preferred, it is noted that any suitable material which provides sufficient insulation and flexibility may be used, as desired.

Figure 2:
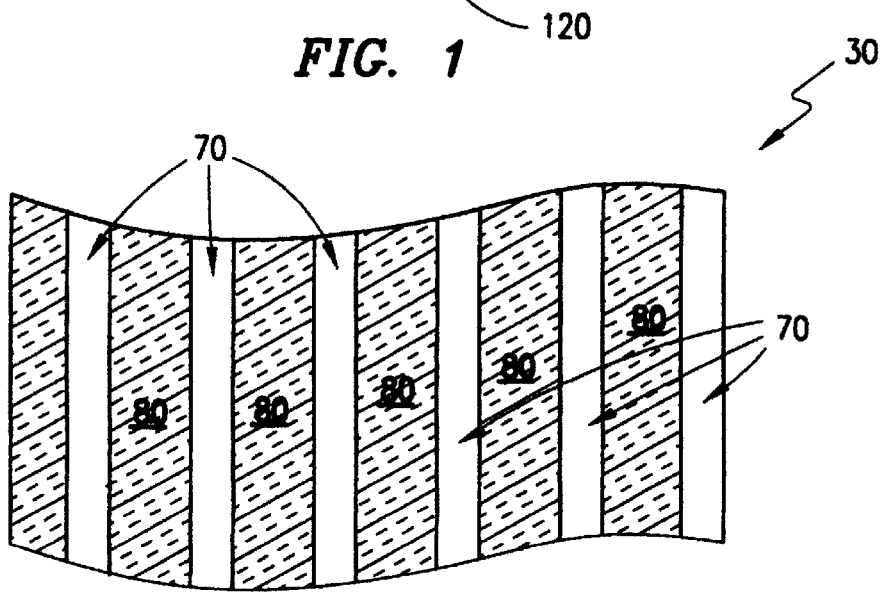
FIG. 2 is a perspective view of a removable sleeve of a first embodiment of the containing device of the present invention.

As more fully illustrated in FIG. 2, the removable sleeve 30 is generally rectangular in shape and is foldable on itself to form a cylindrical ring which can be placed through closeable slot 40 (FIG. 1) into the main body portion 20 (FIG. 1). The removable sleeve 30 is comprised of a plurality of tubes 70 alternating in placement with a plurality of pockets 80. Preferably, from about 4–10 tubes are used per removable sleeve 30. Contained within the tubes 70 are either a refrigerant or a substance capable of providing thermal energy. The substance actually contained in the tubes 70 will depend on whether the containing device 10 will be used to provide and maintain a temperature substantially cooler or substantially warmer than ambient temperature. For purposes of this application, the term "refrigerant"

will be used to refer to any substance capable of absorbing heat, especially during a phase transfer (e.g., from solid to liquid). An example of a reusable refrigerant is commonly known as "Blue Ice", which is essentially water made gelatinous with the addition of a viscosity enhancing agent, such as methyl cellulose. Any substance capable of providing thermal energy, such as rice, may be used in the tubes 70 when a temperature substantially warmer than ambient temperature is desired.

The pockets 80 of the removable sleeve 30 contain a substance which is flexible throughout a wide range of temperatures (preferably from between about 32° F. and 200° F.). Preferably, the pockets 80 are filled with a gelatinous material which provides both insulation and flexibility to the removable sleeve 30.

Figure 3:
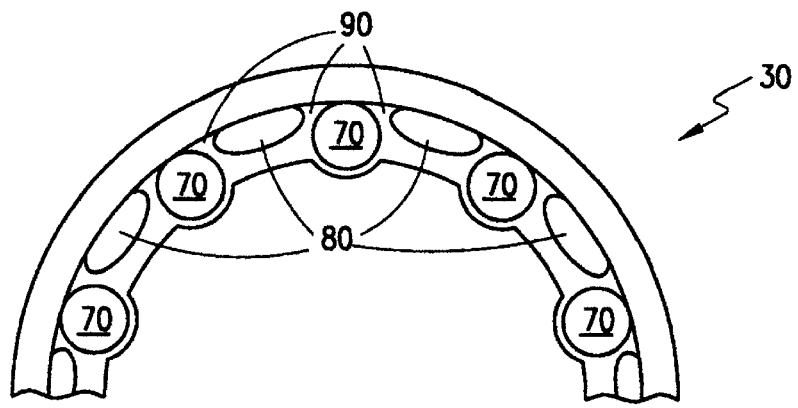
FIG. 3 is a partial top view in cross section of a removable sleeve of a first embodiment of the containing device of the present invention, illustrating the alternating tubes and pockets thereof.

As illustrated in FIG. 3, the preferred placement of the tubes 70 relative to the pockets 80 within the removable sleeve 30 is illustrated. The partial top view in cross section shows that the tubes 70 are alternated in placement with the pockets 80 to achieve maximum flexibility of the overall removable sleeve 30. Additionally, associated with each tube 70 are one or more spaces 90 between the tubes 70 and the pockets 80. These spaces 90 may either be defined by the lack of any material between the tubes 70 and the pockets 80 or may result from the pockets 80 containing less than a maximum amount of the gelatinous material, thus in effect providing additional space between the tubes 70.

Although it is described herein that different removable sleeves are used to provide cooling/warming, it is noted that the present invention encompasses an embodiment where a single removable sleeve containing tubes having both a refrigerant and a thermal energy-providing material, if desired, so that the removable sleeve could be heated or cooled to provide the desired effect. This dual purpose sleeve would be particularly easy to achieve with the second embodiment (i.e., having individually removable tubes) more fully described below. It is believed, however, that such a dual purpose embodiment would not provide as efficient a warming or cooling provision/maintaining effect as the embodiments described more fully herein.

At least two unique features of the containing device 10 of the present invention derive from the above-identified placement of the tubes 70, pockets 80 and spaces 90 relative to each other. First, despite the fact that the tubes may be rigid (e.g., when filled with frozen Blue Ice®) or semi-rigid (e.g., when filled with warmed rice), the overall removable sleeve 30 remains flexible so that it easily and quickly can be removed from/replaced within the main body portion 20 (FIG. 1) and/or otherwise manipulated for heating or cooling apart from the main body portion 20 (FIG. 1).

Another unique benefit of the containing device of the present invention is its ability to receive and hold a beverage containers of a variety of shapes and sizes. This feature also results from the unique placement of the tubes 70, pockets 80 and spaces 90. Since despite the fact that tubes 70 may be rigid or semi-rigid the removable sleeve 30 remains overall flexible, and since the thin wall 100 (FIG. 1) and main body portion 20 are also flexible, the area 50 for receiving and holding the beverage container is likewise flexible and can be stretched to accommodate beverage containers of various sizes and shapes.

Figure 4:
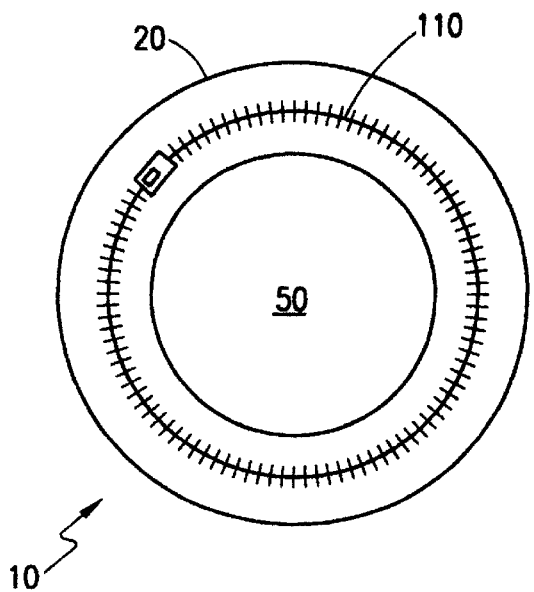
FIG. 4 is a top view of the main body portion of a first embodiment of the containing device of the present invention, illustrating a zipper securing device of the closable slot of the main body portion.
Figure 5:
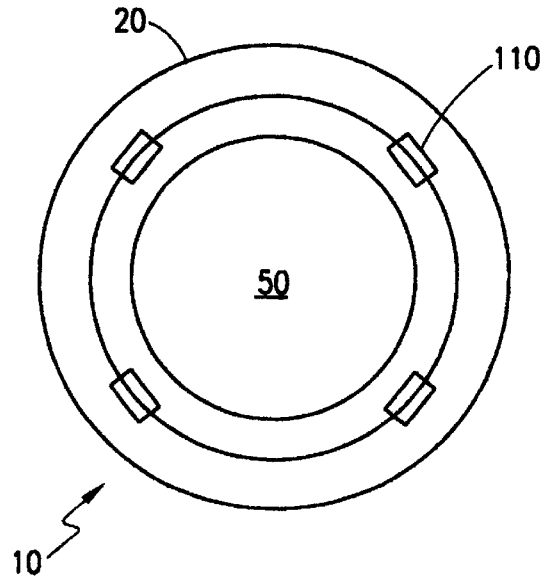
FIG. 5 is a top view of the main body portion of another embodiment of the containing device of the present invention, illustration a hook and loop fastener-like securing device of the closable slot of the main body portion.

Referring now to FIGS. 1, 4 and 5, the closeable slot 40 is preferably secured with a securing device 110. Although placement of the securing device 110 is illustrated to be on top of the main body portion 20, it is noted that the closeable slot 40 and associated securing device 110 can be located at any suitable location on the main body portion 20, including, without limitation, the bottom or side portions of the main body portion 20. As illustrated in FIG. 4, the securing device 110 may be a zipper which is zipped open to remove or replace the removable sleeve 30 and zipped shut to secure the removable sleeve 30 within the main body portion 20. As illustrated in FIG. 5, the securing device may also be one or more hook and loop-type fasteners, such as Velcro®, which may be opened and shut to accomplish removal, replacement and securing of the removable sleeve 30. Although a zipper and hook and loop-type fasteners are described herein, it is noted that any suitable securing device may be used, if desired.

Figure 6:
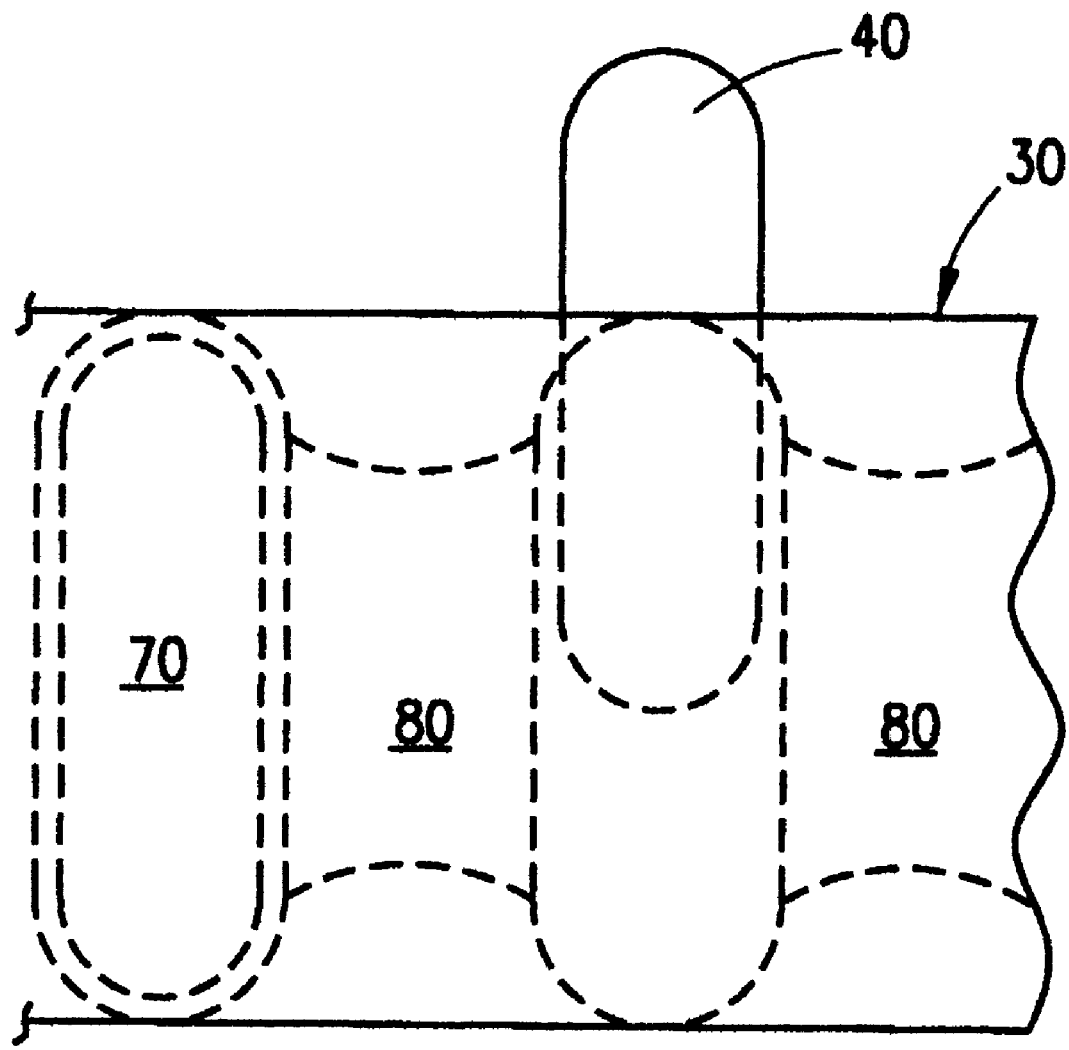
FIG. 6 is a side view in partial cross section of a removable sleeve of a second embodiment of the containing device of the present invention, illustrating the separable tubes of this embodiment of the sleeve.

Now turning to FIG. 6, a second embodiment of the removable sleeve 30 of the present invention is illustrated. In this embodiment, the tubes 70 are individually separable from the removable sleeve 30 to further facilitate cooling/warming of the substance within the tubes 70 and to offer further flexibility to the overall removable sleeve 70. For example, if a very large beverage container was to be used with the containing device 10, one or more of the tubes 70 could be removed from the removable sleeve 30 such that the larger container would fit within the area 50 for receiving and holding the beverage container. Additionally, the ability to individually remove and manipulate the tubes 70 apart from the removable sleeve 30 further facilitates options for warming/cooling the tubes 70 (e.g., stacking the tubes in a very small space in a refrigerator or freezer).

Referring again to FIG. 1, the containing device 10 of the present invention is used as follows: If it is desired to cool a beverage and/or maintain a previously cooled beverage, a removable sleeve 30 containing tubes 70 having a refrigerant is used. The refrigerant-containing tubes are cooled by placing the removable sleeve 30 including the tubes 70, or just the tubes 70 (depending upon the embodiment) in a refrigerator, freezer, or like cooling device. Once the tubes 70 are sufficiently cooled, they (individually or with the removable sleeve 30) are removed and, if necessary, replaced in the removable sleeve 30, prior to replacing the removable sleeve 30 in the closeable slot 40 of the main body portion 20 of the containing device 10. The removable sleeve 30 is secured within the main body portion 20 by closing the closeable slot 40, using a zipper, Velcro® hook and loop fastener, or the like. It is noted the tubes 70 (either individually or as part of the removable sleeve 30) may be stored in a refrigerator, freezer or like cooling device so that they remain available for immediate use.

If it is desired to warm a beverage and/or maintain a previously warmed beverage, a removable sleeve 30 containing tubes 70 having a substance capable of transferring thermal energy, such as rice, is used. Similar procedures as those discussed above are also employed for a warm beverage.

Regardless of whether cool or warm beverages are desired, once the removable sleeve 30 is secured within the main body portion 20, the beverage container to be held is placed into the area 50 for receiving and holding the beverage container. Importantly, due to the unique placement of the tubes 70 (including the ability to individually remove the tubes 70 in one embodiment), pockets 80 and spaces 90 of the containing device of the present invention, the containing device 10 of the present invention can receive and hold a wide variety of sizes and shapes of beverage containers.

Once the beverage container is received in the area 50 for receiving and holding the beverage container, the tubes 70 either remove thermal energy or provide thermal energy (depending upon whether the beverage is cool or warm) to the beverage container and, thus, to the beverage itself Where ambient or near-ambient temperature beverage containers are placed in the containing device 10, the tubes 70 will either warm or cool the beverage and maintain the higher or lower temperature provided for an extended period of time. The thermal conductivity characteristics of the main body portion 20 material (e.g., neoprene) and the pockets 80 will assist in the provision and maintenance of the a raised or lowered temperature.

A hole 120 located in the bottom portion of the main body portion 20 allows for water from condensation to drain from the containing device 10. Although a single hole 120 is illustrated, it is noted that any number, size or shape of openings suitable to facilitate draining of unwanted liquids is contemplated by the present invention.

The outer and/or inner surfaces of the main body portion 20 are preferably constructed of a material upon which printed textual and/or graphical material, such as advertising, promotional messages, political messages, instructions, information, and the like, can be formed through printing, reverse printing, screening or any other suitable method.

Although preferred embodiments of the invention have been illustrated in the accompanying drawing and described in the foregoing Detailed Description, it will be understood that the invention is not limited to the embodiments disclosed, but is capable of numerous rearrangements and modifications of parts and elements without departing from the spirit of the invention.

What is claimed is:

1. A containing device, comprising:
   a main body portion capable of receiving a beverage container;
   a removable sleeve;
   said removable sleeve further comprising a plurality of tubes and a plurality of pockets;
   said tubes containing a substance capable of receiving, and maintaining for an extended period of time, a temperature substantially above or below ambient temperature;
   said pockets containing a flexible substance; and
   said removable sleeve, when associated with the main body portion, capable of providing to said beverage container and maintaining for an extended period of time a temperature substantially above or below ambient temperature.

2. The containing device of claim 1, wherein the main body portion is generally cylindrical, defining an area for receiving said beverage container.

3. The containing device of claim 1, wherein the main body portion further includes a closeable slot for receiving the removable sleeve.

4. The containing device of claim 3, wherein the closable slot is accessed via a zipper.

5. The containing device of claim 3, wherein the closable slot is accessed via a hook and loop fastener, such as Velcro®.

6. The containing device of claim 3, wherein the closeable slot is located in an area selected from the group consisting of: top of the main body portion; bottom of the main body portion and a side of the main body portion.

7. The containing device of claim 1, wherein the main body portion is constructed of an insulating and flexible material.

8. The containing device of claim 7, wherein the material is neoprene.

9. The containing device of claim 1, wherein one or more exterior surface and/or an interior surface of the main body portion include(s) graphical and/or textual materials.

10. The containing device of claim 1, wherein the removable sleeve is generally rectangular in shape and is foldable to form a generally cylindrical shape.

11. The containing device of claim 1, wherein placement of the tubes within the removable sleeve is alternated with placement of the pockets such that each pocket has a tube on either side and each tube has a pocket on either side.

12. The containing device of claim 1, wherein the substance contained by the plurality of tubes is a refrigerant.

13. The containing device of claim 12, wherein the refrigerant is Blue Ice®.

14. The containing device of claim 1, wherein the substance contained by the plurality of tubes is capable of providing thermal energy to the beverage container.

15. The containing device of claim 14, wherein the substance is rice.

16. The containing device of claim 2, wherein a flexible wall separates the closeable slot from said area for receiving said beverage container, allowing the main body portion to receive a variety of shapes and sizes of beverage containers.

17. The containing device of claim 16, wherein the flexible wall is constructed of a thin, durable and slippery material.

18. The containing device of claim 17, wherein the thin, durable and slippery material is selected from the group consisting of: vinyls, thermoplastics and nylons.

19. The containing device of claim 1, wherein the flexible substance in the plurality of pockets is gelatinous and remains flexible over a range of temperatures from about 32° F. to 200° F.

20. The containing device of claim 1, wherein the plurality of tubes are individually separable from the removable sleeve.

* * * * *